US008262096B2

(12) United States Patent
Mack

(10) Patent No.: US 8,262,096 B2
(45) Date of Patent: Sep. 11, 2012

(54) SELF-TIGHTENING DRILL CHUCK

(75) Inventor: Hans-Dieter Mack, Sontheim (DE)

(73) Assignee: ROEHM GmbH, Sontheim (DE)

( * ) Notice: Subject to any disclaimer, the term of this patent is extended or adjusted under 35 U.S.C. 154(b) by 770 days.

(21) Appl. No.: 12/304,553

(22) PCT Filed: Oct. 13, 2007

(86) PCT No.: PCT/DE2007/001824
§ 371 (c)(1),
(2), (4) Date: Dec. 12, 2008

(87) PCT Pub. No.: WO2008/052507
PCT Pub. Date: May 8, 2008

(65) Prior Publication Data
US 2010/0207336 A1 Aug. 19, 2010

(30) Foreign Application Priority Data
Oct. 28, 2006 (DE) .......................... 10 2006 050 916

(51) Int. Cl.
*B23B 31/16* (2006.01)
(52) U.S. Cl. ........................... 279/60; 279/140; 279/902
(58) Field of Classification Search ............. 279/60–65, 279/140, 902; 408/124, 240; *B23B 13/16*
See application file for complete search history.

(56) References Cited

U.S. PATENT DOCUMENTS

| | | | | |
|---|---|---|---|---|
| 4,302,021 A * | 11/1981 | Rohm | .............................. | 279/60 |
| 5,031,925 A * | 7/1991 | Tatsu et al. | ...................... | 279/64 |
| 5,431,419 A * | 7/1995 | Mack | .............................. | 279/62 |
| 5,435,578 A * | 7/1995 | Rohm | .............................. | 279/62 |
| 5,499,829 A * | 3/1996 | Rohm | .............................. | 279/62 |
| 5,741,016 A * | 4/1998 | Barton et al. | .................... | 279/62 |
| 5,765,839 A * | 6/1998 | Rohm | .............................. | 279/62 |
| 6,341,783 B1 * | 1/2002 | Rohm | .............................. | 279/62 |
| 6,843,485 B2 * | 1/2005 | Sakamaki et al. | .............. | 279/62 |
| 7,156,402 B2 * | 1/2007 | Mack | .............................. | 279/60 |
| 7,185,895 B2 * | 3/2007 | Cachod et al. | .................. | 279/62 |
| 7,431,308 B2 * | 10/2008 | Cachod | .......................... | 279/62 |
| 7,497,444 B2 * | 3/2009 | Sakamaki et al. | .............. | 279/62 |
| 7,726,663 B2 * | 6/2010 | Mack et al. | ..................... | 279/60 |
| 7,841,601 B2 * | 11/2010 | Mack | .............................. | 279/60 |
| 8,056,906 B2 * | 11/2011 | Mack | .............................. | 279/64 |
| 8,070,168 B2 * | 12/2011 | Mack | .............................. | 279/60 |
| 2006/0284386 A1 * | 12/2006 | Mack | .............................. | 279/60 |

(Continued)

FOREIGN PATENT DOCUMENTS
DE          4305744      2/1993
(Continued)

*Primary Examiner* — Eric A Gates
(74) *Attorney, Agent, or Firm* — Andrew Wilford

(57) ABSTRACT

The invention relates to a re-tightening drill chuck with a chuck body (1), a tightening sleeve (2) which can rotate coaxially with respect to the chuck body (1) and is axially supported on a jaw holder (3), which is mounted on the chuck body (1) and in which clamping jaws (4) are guided in guiding slots and are adjustable for clamping and release by relative rotation between the chuck body (1) and the tightening sleeve (2) with the jaw holder, wherein a stop is formed on the jaw holder (3) and a counter-stop (11) is formed on the tightening sleeve (2) for the defined delimitation of a relative rotatability of the tightening sleeve (2) with respect to the jaw holder (3) between a first rotational position and a second rotational position.

21 Claims, 12 Drawing Sheets

U.S. PATENT DOCUMENTS

2007/0273109 A1  11/2007  Mack .......................... 279/140

FOREIGN PATENT DOCUMENTS

| DE | 19710565 | C1 | * | 6/1998 |
| DE | 19907330 | A1 | * | 8/2000 |
| EP | 598176 | A1 | * | 5/1994 |
| EP | 710518 | A2 | * | 5/1996 |
| EP | 1055472 | A1 | * | 11/2000 |
| EP | 1419837 | A1 | * | 5/2004 |
| EP | 1714721 | | | 10/2005 |

* cited by examiner

SELF-TIGHTENING DRILL CHUCK

CROSS REFERENCE TO RELATED APPLICATIONS

This application is the US national phase of PCT application PCT/DE2007/001824, filed 13 Oct. 2007, published 8 May 2008 as WO2008/052507, and claiming the priority of German patent application 102005050916.1 itself filed 28 Oct. 2006, whose entire disclosures are herewith incorporated by reference.

The invention relates to a self-tightening drill chuck having a chuck body, a tightening sleeve (2) rotatable coaxially relative to the chuck body, axially fixed on a jaw holder carried on the chuck body, and in which jaws guided in grooves are movable with the jaw holder for tightening and loosening on a relative rotation between the chuck body and the tightening sleeve, a stop on the tightening sleeve and a counterstop on the jaw holder only permitting relative rotation of the tightening sleeve and the jaw holder between a first angular position and a second angularly offset position, a catch having a catch member with one catch seat associated with the first angular position and one catch seat associated with the second angular position being provided between the jaw holder and the tightening sleeve.

Such a drill chuck known from German patent document 10 2006 024 819.8 [US 2007/0273109] is self-tightening and thus during drill operation assures secure gripping of the drill tool, even if for instance when using a hammer drill the edges of the jaws dig into the bit shaft. However, it is problematic when drilling is to be performed with very high power drills using large drilling diameters because there is the risk that the tightening will be so effective it will only be possible to open the drill grip with great effort or with a tool, or it might not be possible at all.

The underlying object of the invention is therefore to create a self-tightening drill chuck of the above-described type such that reliable opening of the drill chuck is assured for changing the tool.

This object is attained in a drill chuck of the above-described type in that rotatably carried on the chuck body is a grip sleeve rotatable on the chuck body carries a locking slide that when changing between the second angular position and the first angular position is displaced from a position disengaged from a first array of gear teeth on the chuck body into an engaged position, and vice versa, and in that a stop is provided for limiting relative rotation of the grip sleeve and the jaw holder in a tightening direction. This drill chuck is distinguished in that tightening is automatically limited by the user when tightening on a drill bit, without the user being aware of this and having to perform additional manipulations. The rotation of the grip sleeve relative to the chuck body is terminated by the inventively provided locking slide when the catch is changed between the second and the first angular position so that the jaw holder can only be displaced, relative to the grip sleeve, until it is positioned against the stop.

In the framework of the invention, the tightening sleeve and/or the jaw holder have a cam formation for radial displacing the locking slide, in this manner assuring engagement in the locking teeth of the first gear teeth. In this position, the locking slide is acted upon by a spring that biases it into engagement with the first gear teeth. The engagement can be assured using the cam formation and/or an enlargement formed on the release ring. Preferably the cam formation is formed on a control ring that is angularly fixed to the tightening sleeve, as an axially spaced collar that engages in a transverse slot of the locking slide, because in this manner only displacement of the locking slide radially inward and radially outward is possible.

In addition, with regard to the simplicity of the structure of the drill chuck it is favorable when the stop is formed by a pin that is mounted on the jaw holder and that engages in a slot that is formed in the grip sleeve and that extends angularly. The length of the slot determines the amount of tightening. Preferably the slot extends over an angle of 12° to 36°, preferably 24°, because this arc provides adequate tightening properties without permitting the drilling tool to grip too tightly.

A return spring is mounted between the grip sleeve and the jaw holder so that the complete tightening path is always available at the beginning of a tightening process for the drill tool.

One very preferred embodiment of the invention is characterized by a locking device that has, on the one hand, an array of second gear teeth coaxial with the chuck axis, and on the other hand, a latch pawl carried on the jaw holder and biased into engagement with the second gear teeth by a spring, and the locking device locks the chuck body and the latch pawl against relative rotation in the direction loosening the jaws when the latch pawl is engaged with the second gear teeth, but permits relative rotations in the tightening direction, the first angular position corresponding to the latched condition and the second angular position corresponding to the unlatched condition of the latch pawl relative to the second gear teeth. This embodiment is distinguished in that because of the limited tightening not only is the tightening sleeve prevented from being displaced too far with respect to the chuck body in the tightening direction, but also opening of the drill chuck during drilling operation due to vibrations that occur is prevented. In this embodiment of the drill chuck, the catch that is already present is used for the locking device in order to intentionally displace the tightening sleeve between the two angular positions that are associated with the latch pawl being engaged and disengaged.

This then provides the possibility for the tightening sleeve to have a second cam formation for displacing the latch pawl out of the position engaged with the ring of teeth into the disengaged position when the tightening sleeve is rotated in the loosening direction for releasing the jaws. In order to reduce the number of components necessary for constructing the drill chuck, the second cam formation is on the control ring. Moreover, the configuration is such that the latch pawl is formed as a two-arm lever having a first lever arm with at least one ratchet tooth and a second lever arm riding on the second cam formation, the pivot of the latch pawl and the pin being integrally formed by one component.

The spring acts on the first lever arm that has the ratchet tooth. In addition, the tightening sleeve is configured in two parts with a release ring that displaces the latch pawl. The second ring of teeth is formed on the chuck body.

However, with the inventively provided tightening limitation, care must be taken that, given an increased initial resistance during the tightening process, perhaps because the drill chuck is dirty and therefore difficult to manipulate, it is rotated in the opening direction "to the stop" with very high torque and is thereby lightly gripped, or that the drill bit is inserted incorrectly between the jaws, the tightening limitation can already be activated, which can lead to a limitation in the tightening force due to the limited adjusting path. Therefore, it is preferred when there are means present for increasing the initial torque required at the beginning of the tightening process and these means release the initial blocking and the subsequent tightening can be continued with the normal torque before the tightening limitation occurs.

This means can be created in a simple manner in that the jaw holder has a bolt that engages in a bolt seat associated with the tightening sleeve under the force of a spring, whereby for preventing a reduction in the maximum attainable tightening force the bolt head facing the bolt seat is formed in cooperation with the bolt seat for determining the switching force and the force of the spring is selected to be as low as possible in order to assure that the bolt merely engages in the bolt seat.

Alternatively or in addition, this means can be formed in that the control ring is formed with at least one switching tab that prior to the beginning of the tightening process engages in a tab pocket formed on the jaw holder and at the beginning of the tightening processes leaves it.

In the following, the invention is explained in greater detail with reference to embodiments shown in the drawings.

Figure 1:
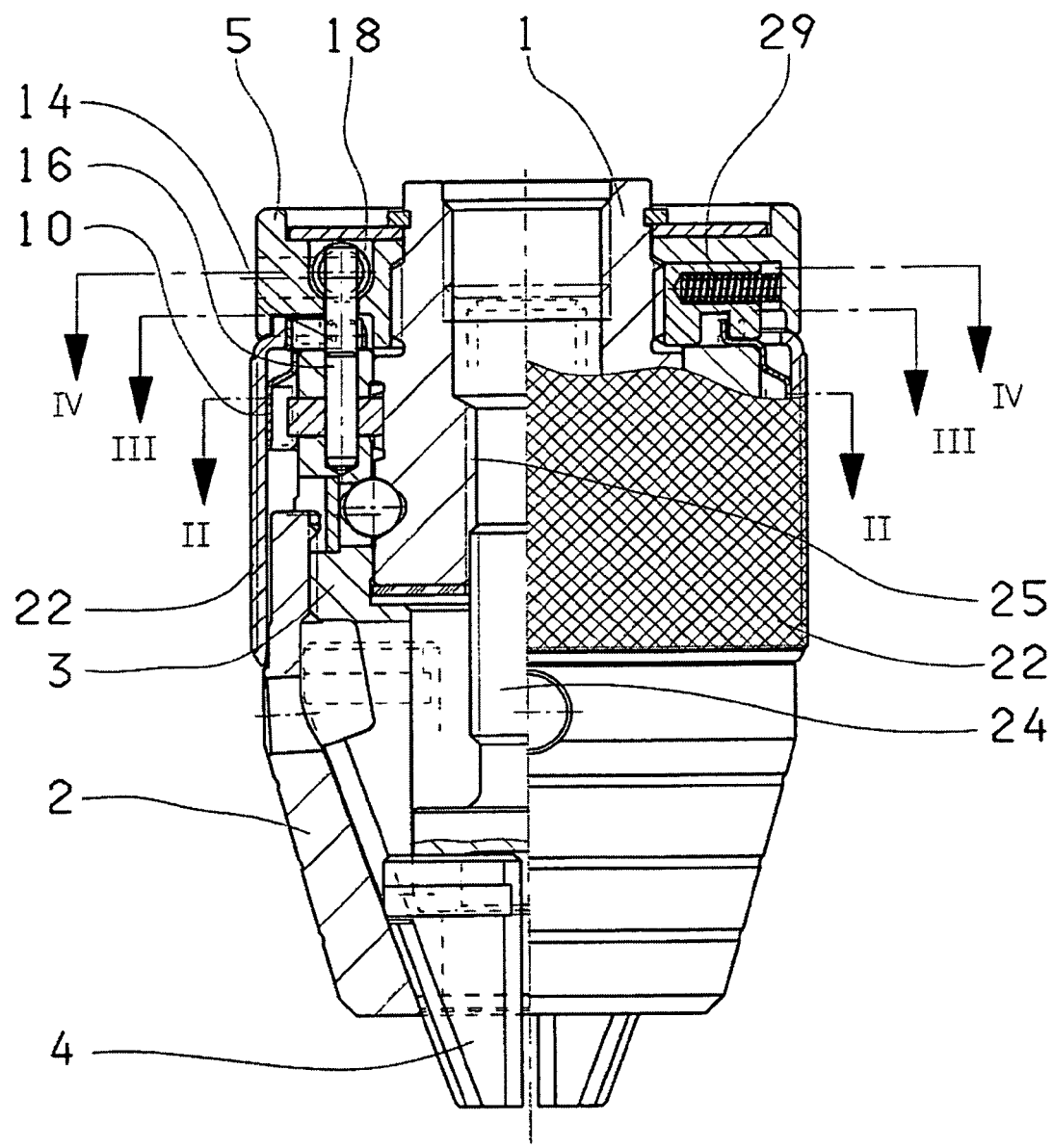
FIG. 1 is a side view of an inventive drill chuck in section on in the left half and on the end that is axially to the rear.
Figure 2:
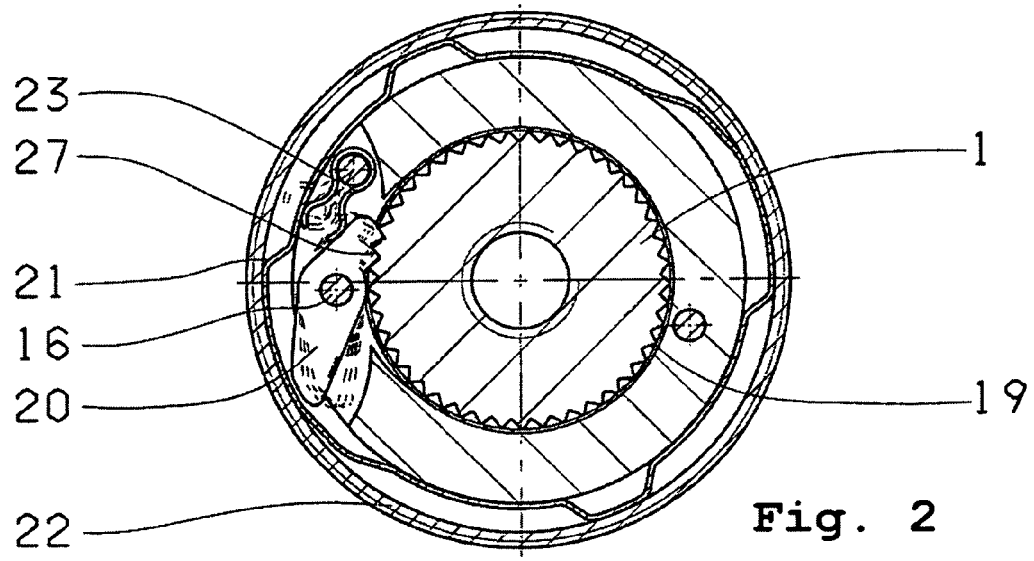
FIG. 2 is section II-II from FIG. 1.
Figure 3A:
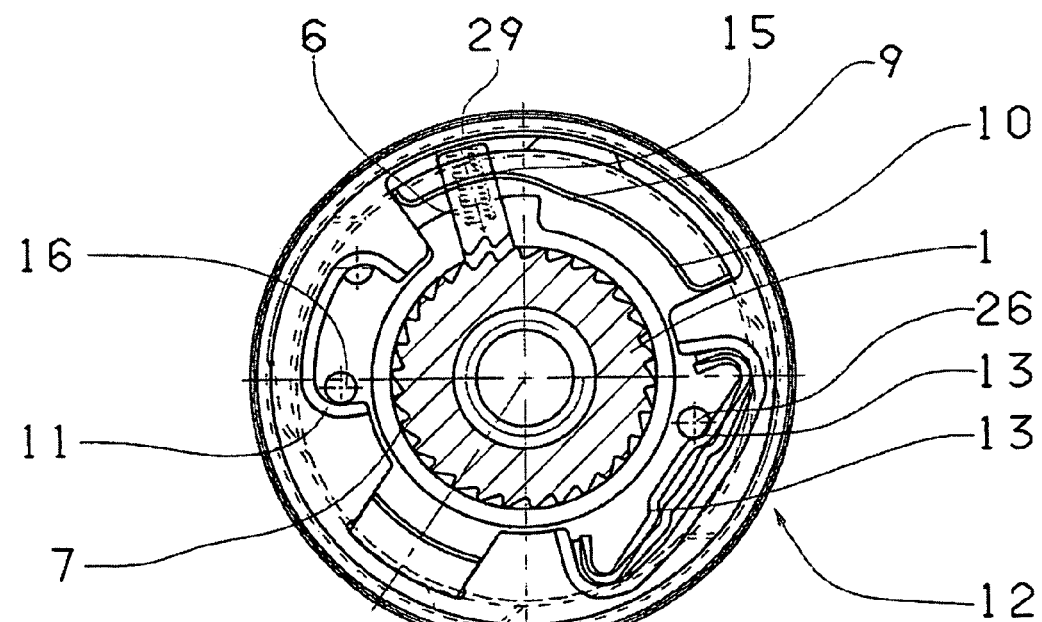
FIG. 3A is section III-III from FIG. 1, shown in the release position.
Figure 3B:
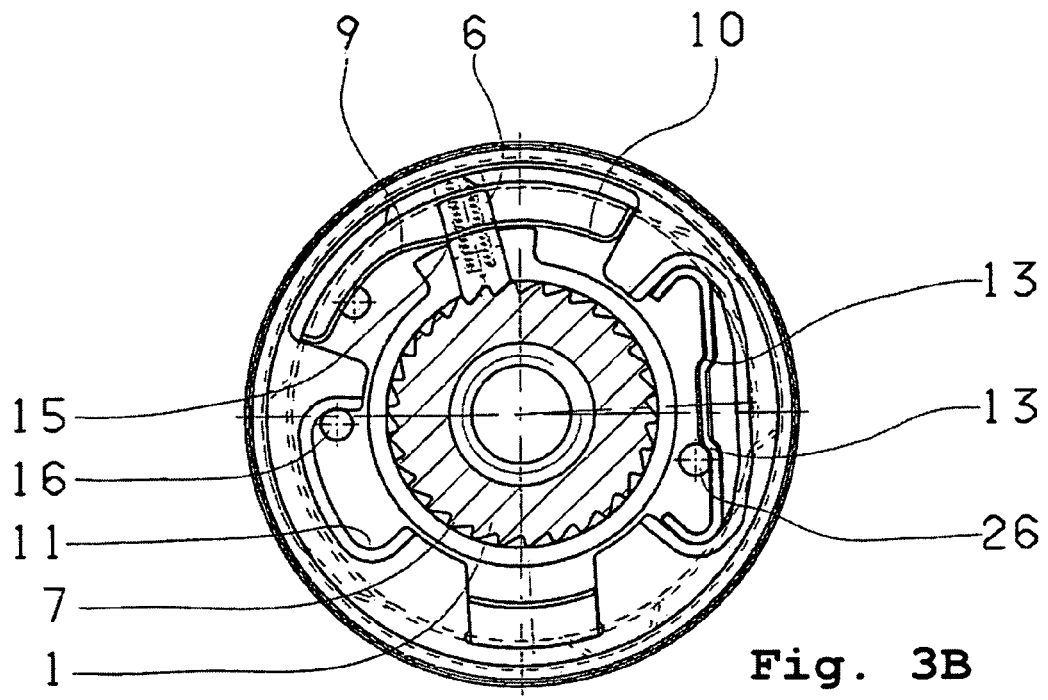
FIG. 3B is section III-III from FIG. 1, shown in the tightening position.
Figure 4:
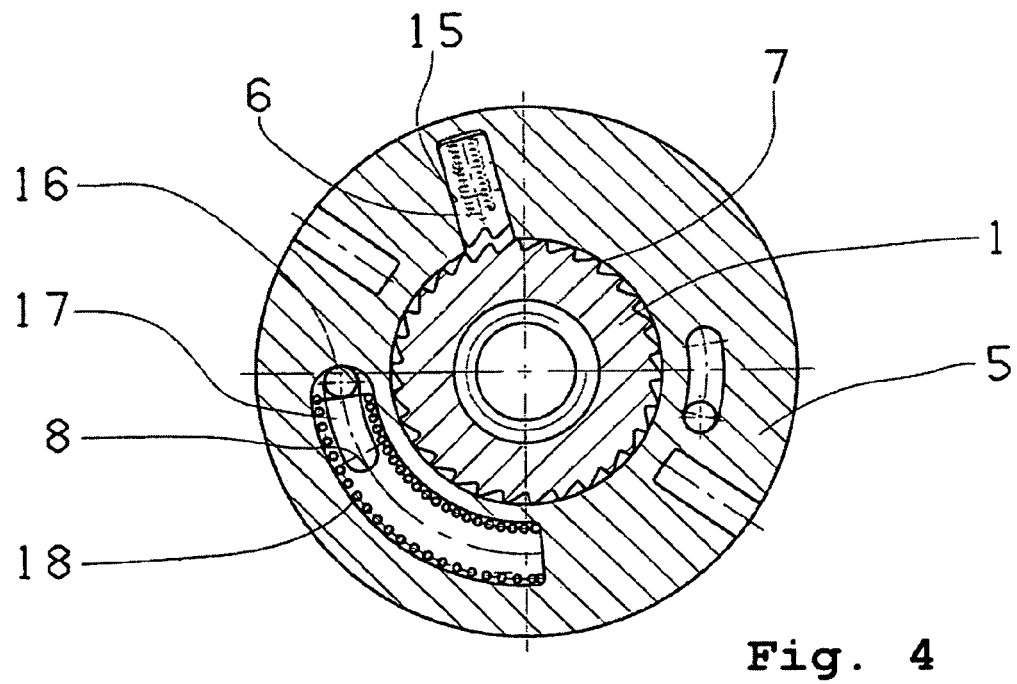
FIG. 4 is section IV-IV from FIG. 1.
Figure 5:
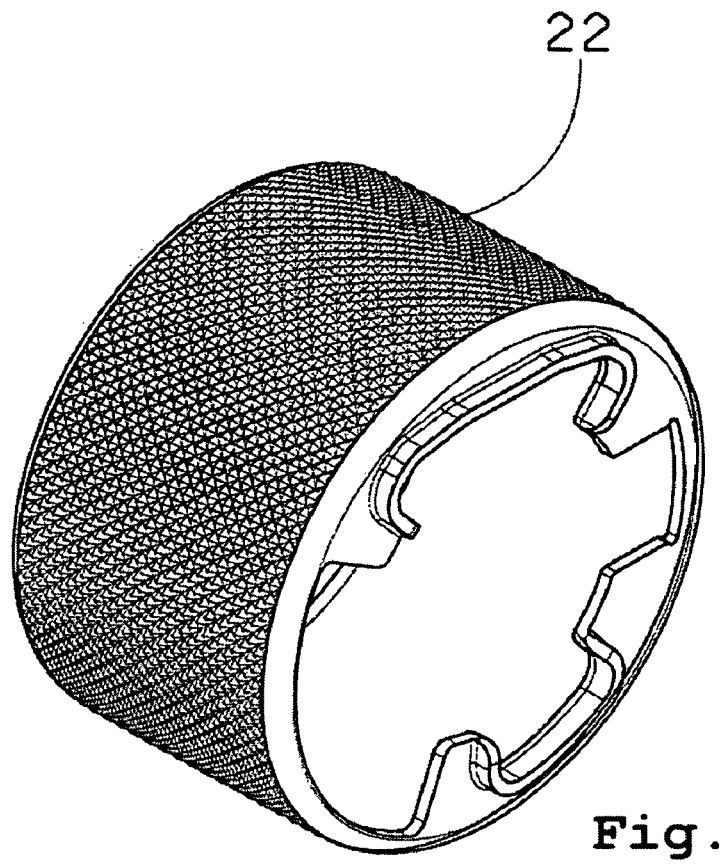
FIG. 5 is a perspective elevation of the release ring.
Figure 6:
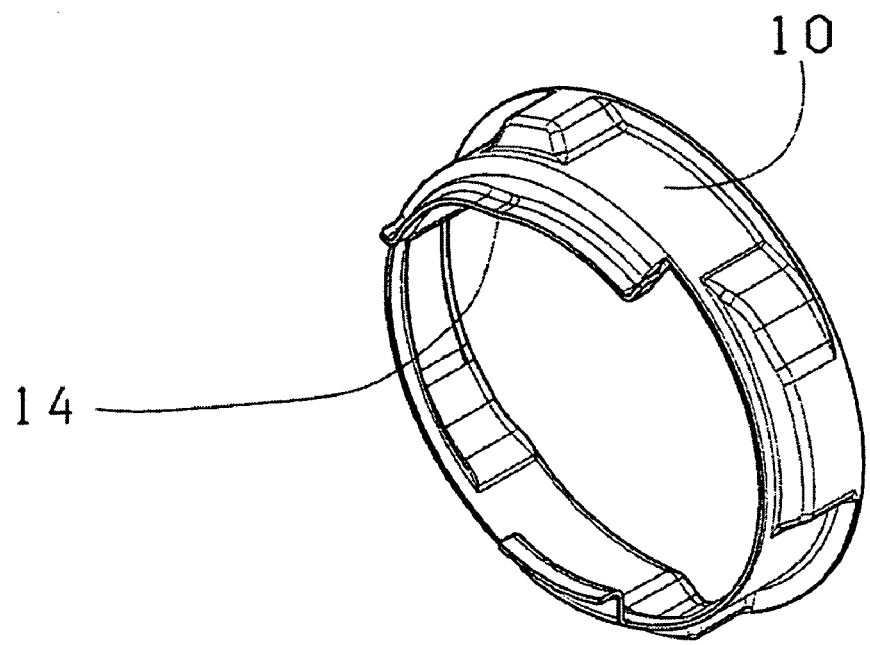
FIG. 6 is a perspective elevation of the control ring.
Figure 7:
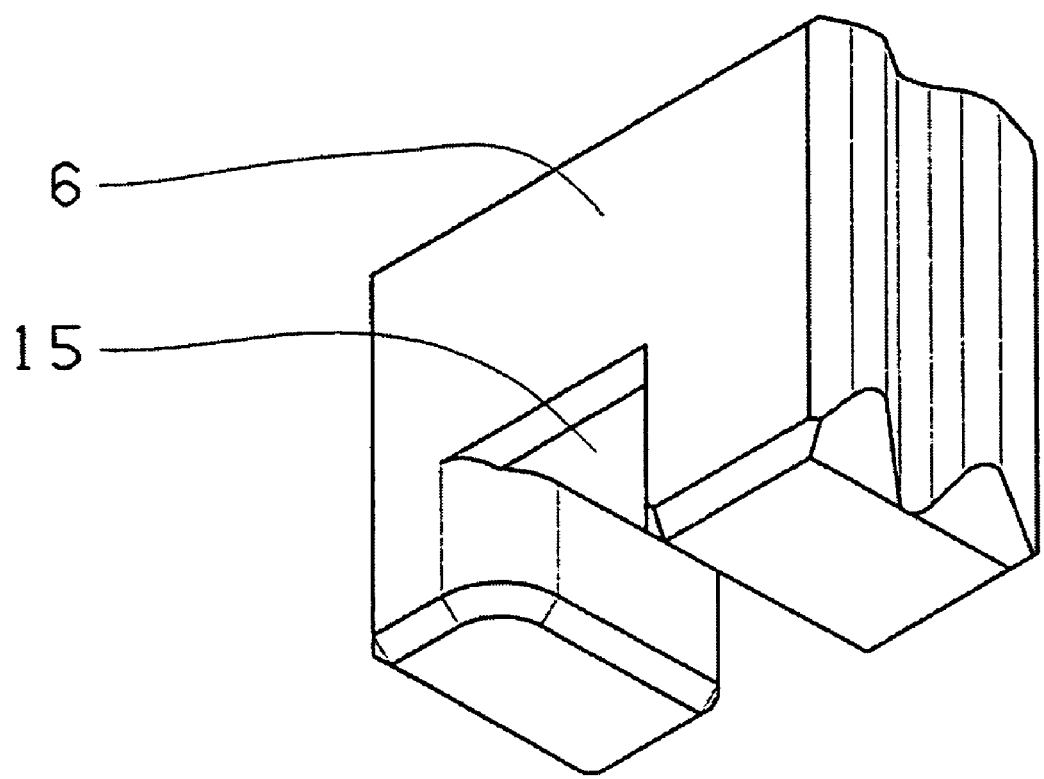
FIG. 7 is a perspective elevation of the locking slide.
Figure 8:
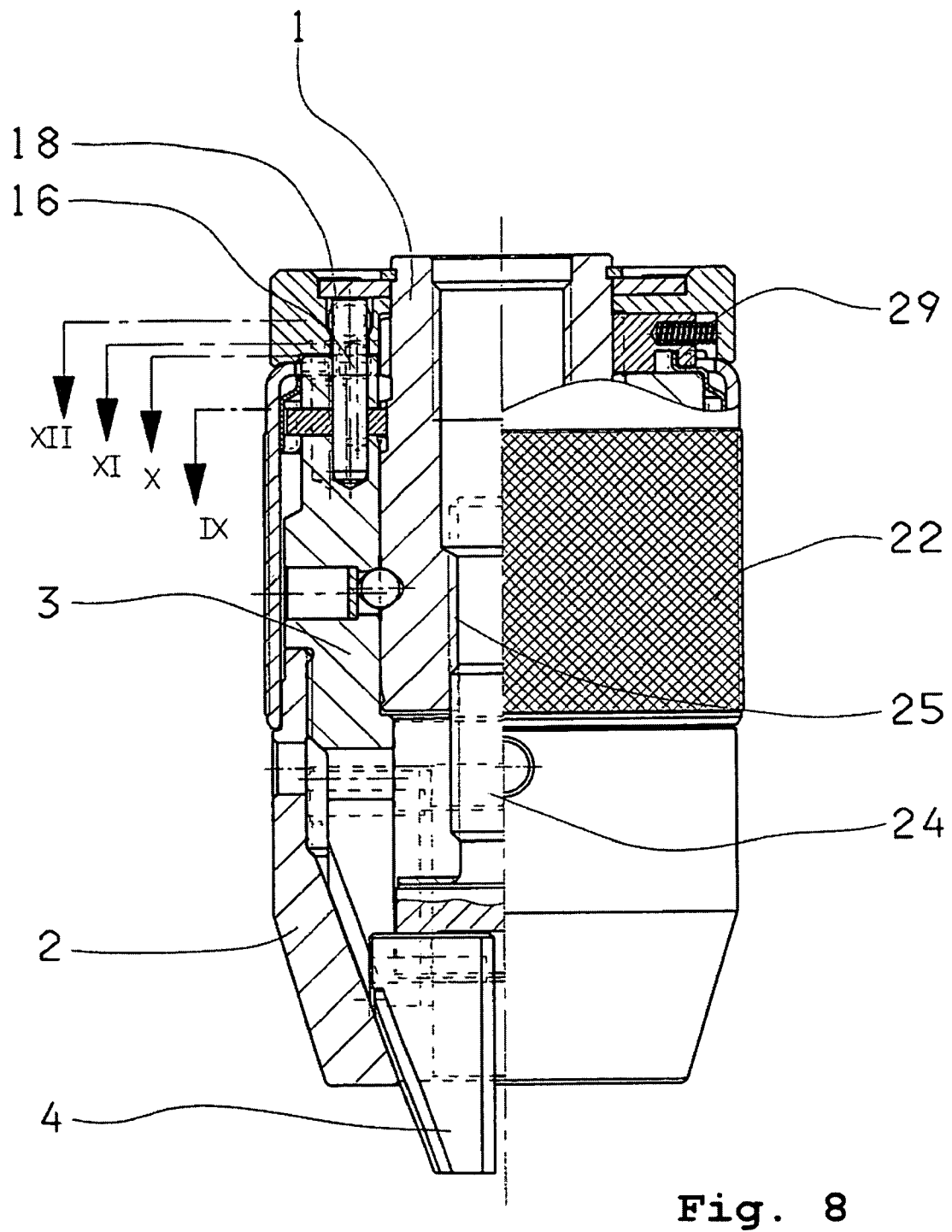
FIG. 8 illustrates another embodiment shown as in FIG. 1.
Figure 9:
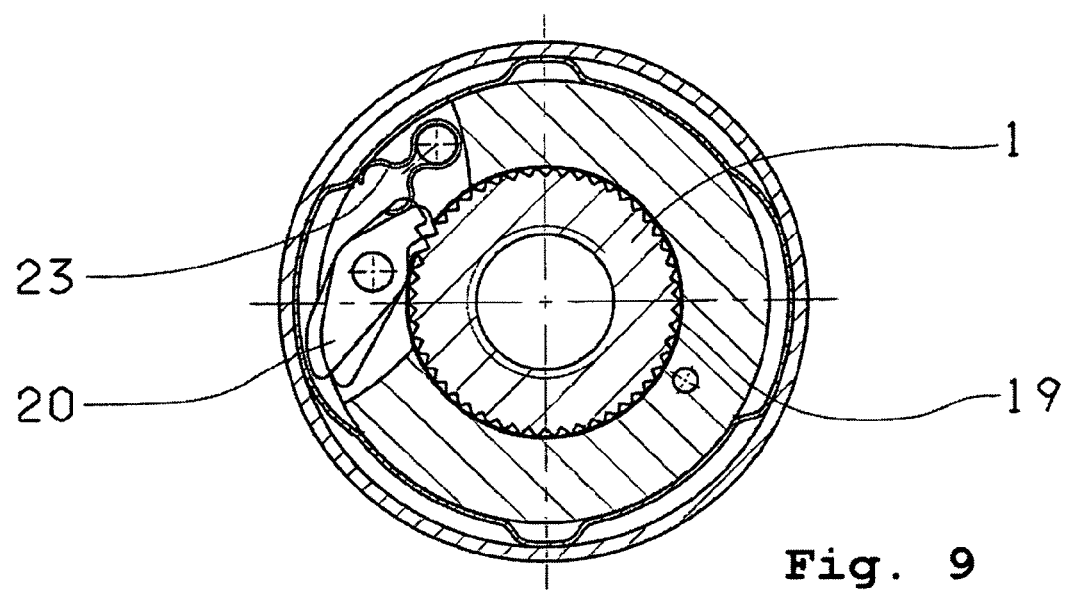
FIG. 9 is section IX-IX from FIG. 8.
Figure 10:
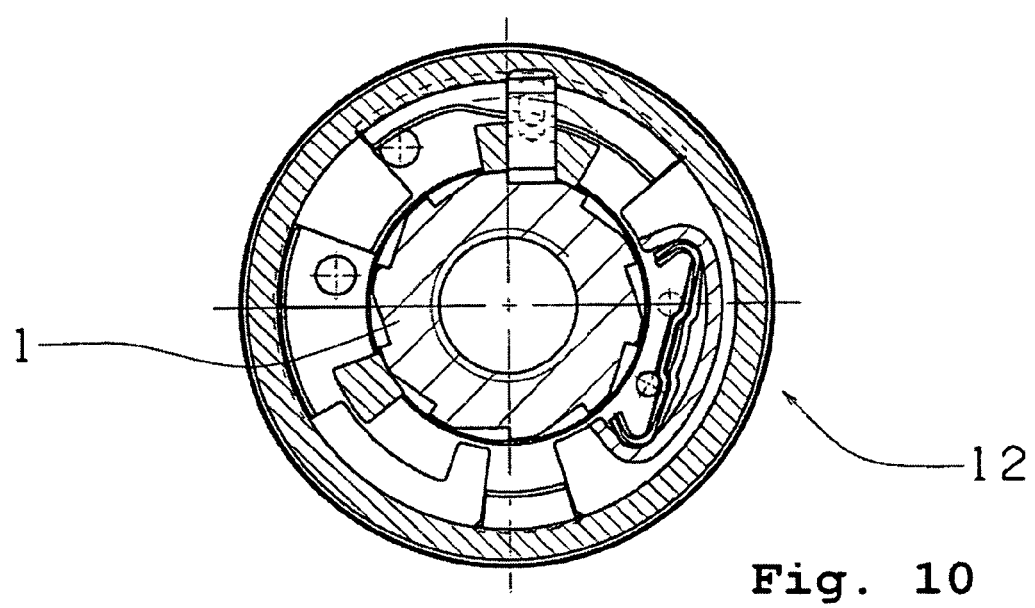
FIG. 10 is section X-X from FIG. 8.
Figure 11:
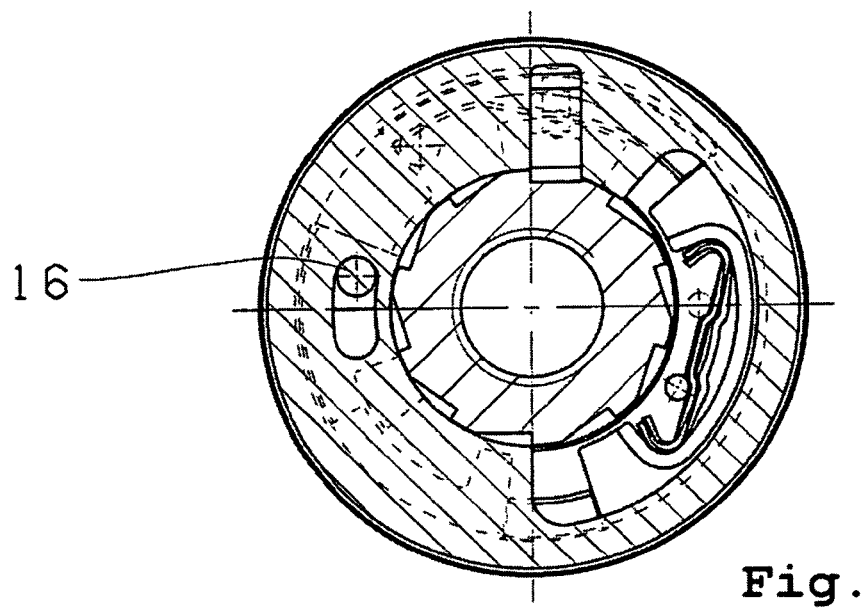
FIG. 11 is section XI-XI from FIG. 8.
Figure 12:
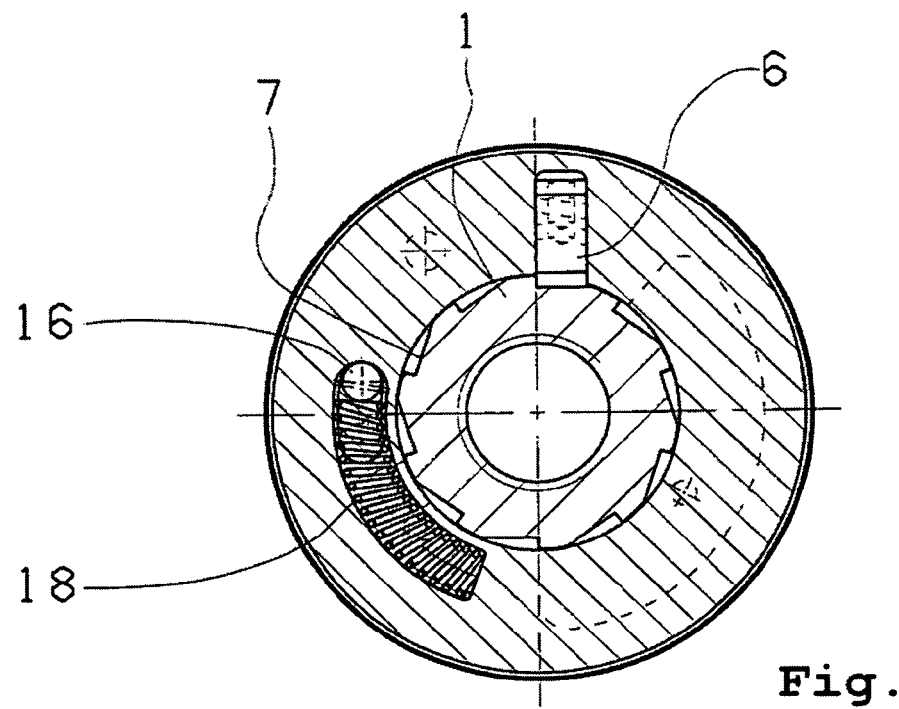
FIG. 12 is section XII-XII from FIG. 8.
Figure 13:
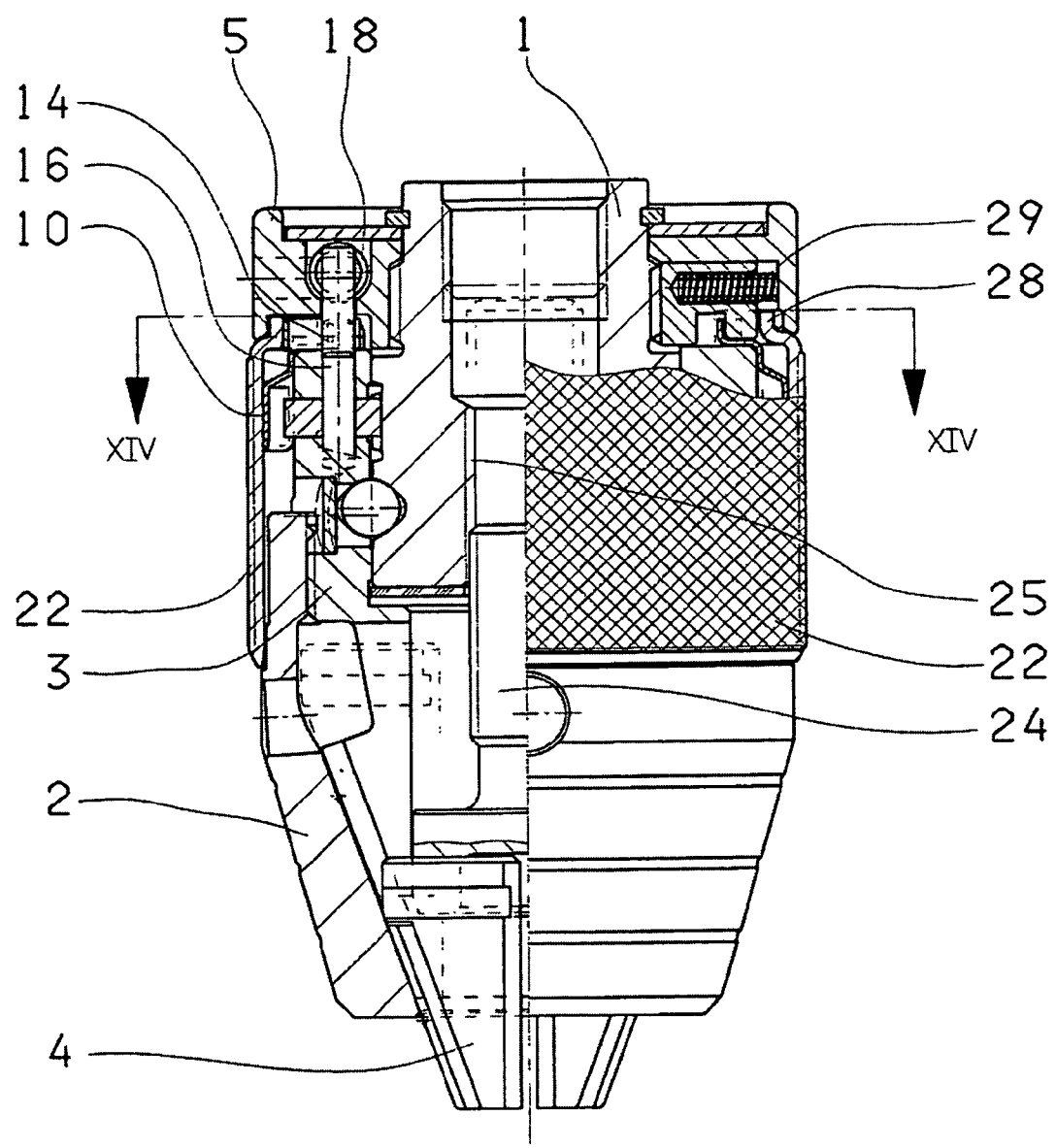
FIG. 13 illustrates another embodiment shown as in FIG. 1.
Figure 14:
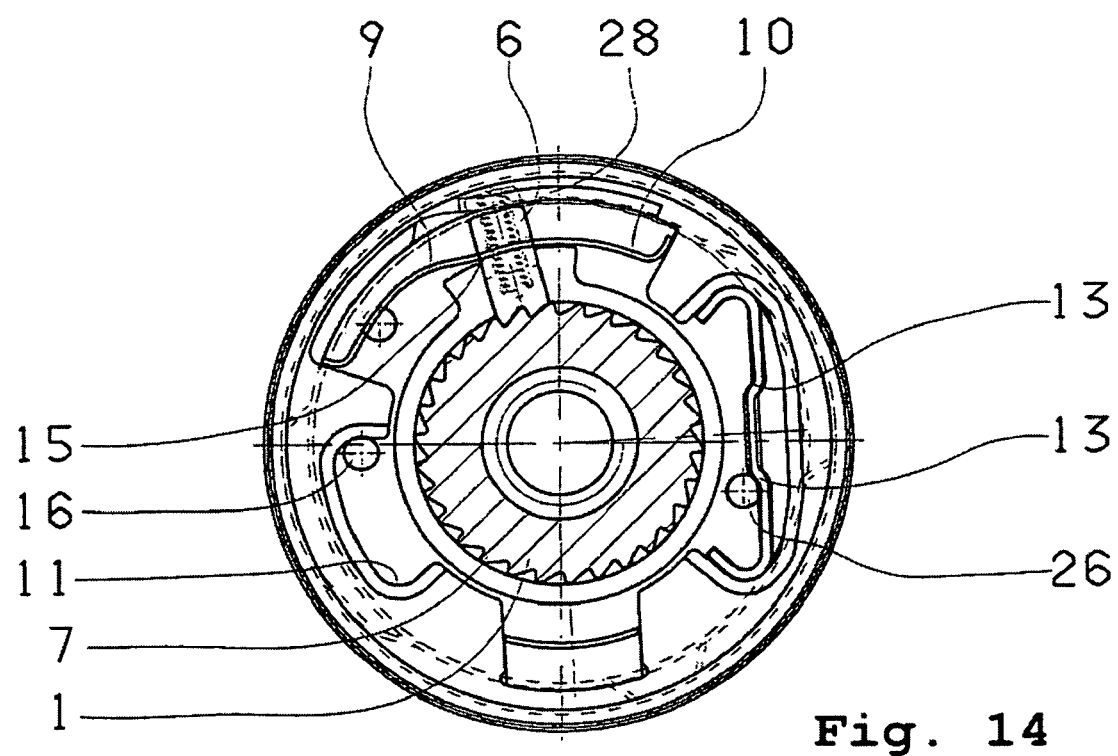
FIG. 14 illustrates the embodiment from FIG. 13 shown as in FIG. 3B.
Figure 15:
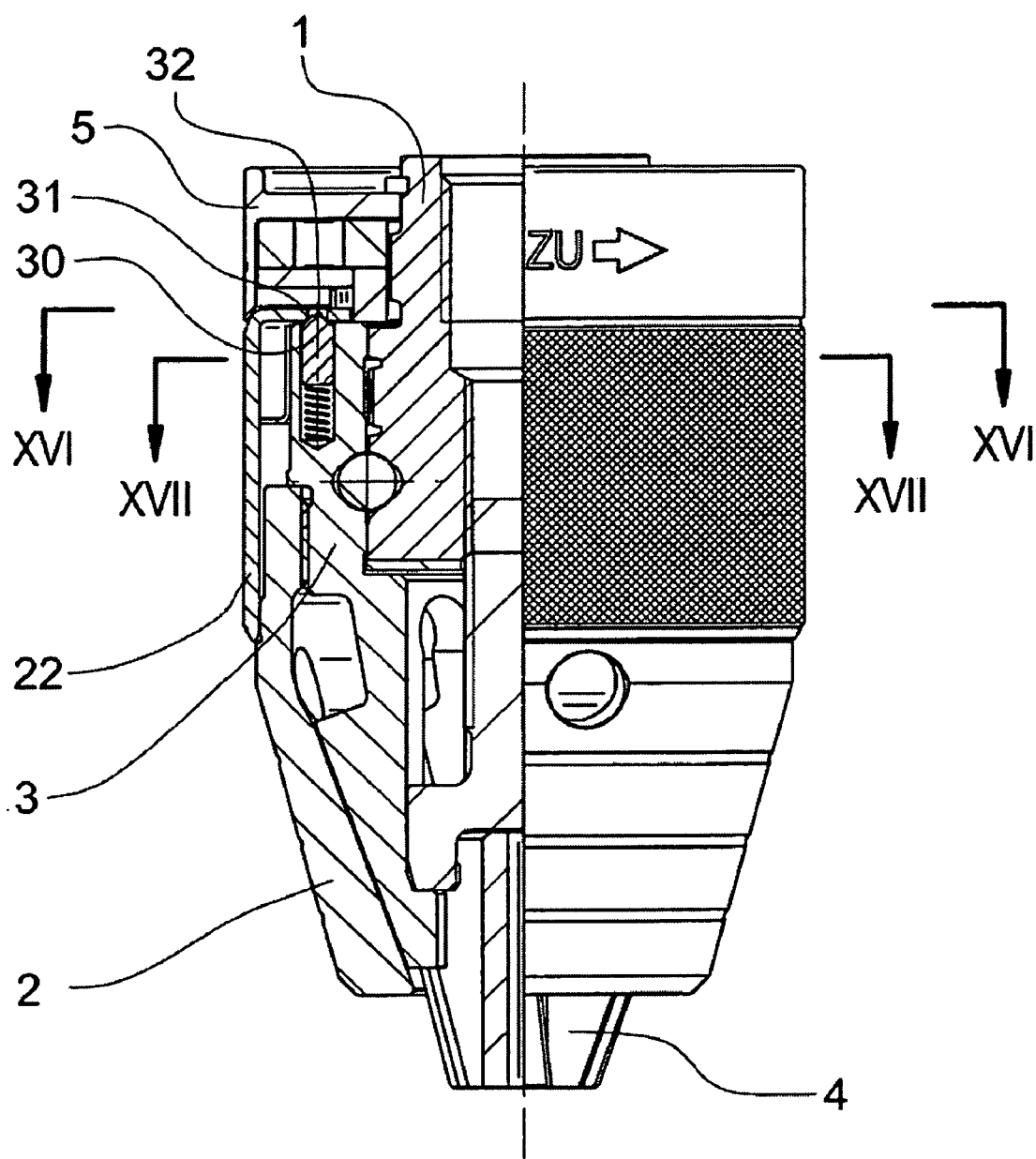
FIG. 15 illustrates another embodiment shown as in FIG. 1.
Figure 16:
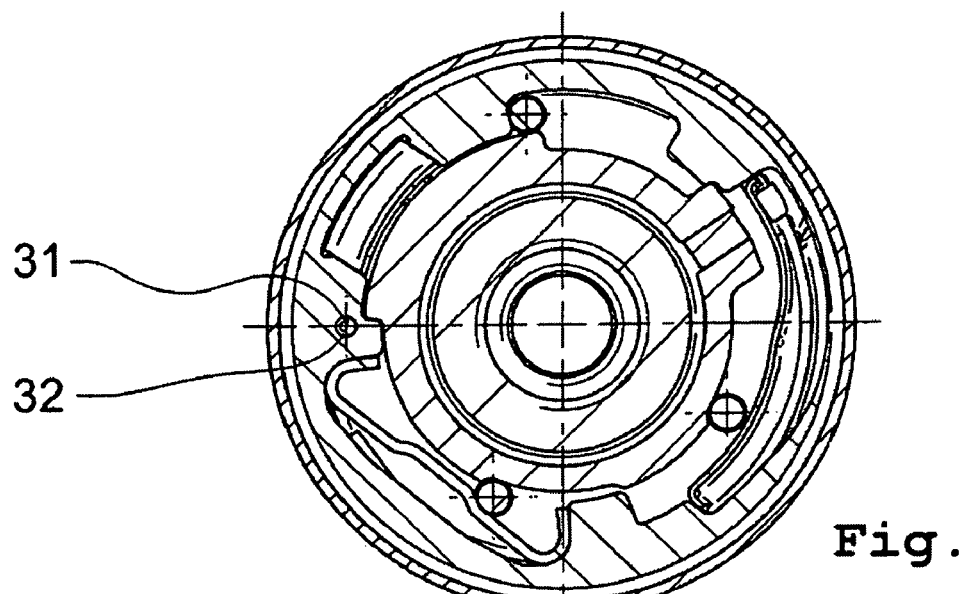
FIG. 16 is section XVI-XVI from FIG. 15.

FIG. 1 shows a self-tightening drill chuck that has a chuck body 1 and a tightening sleeve 2 that can be rotated about an axis relative to the chuck body 1 and that is axially fixed to a jaw holder 3 journaled on the chuck body 1. Guided in grooves in the jaw holder 3 are jaws 4 that are moved by the jaw holder 3 for tightening and loosening by relative rotation between the chuck body 1 and the tightening sleeve 2. The drill chuck furthermore includes a locking device that has, on the one hand, an array of second gear teeth 19 that is coaxial with the chuck axis, and on the other hand, a latch pawl 20 that is carried on the jaw holder 3 and that is pressed against the second gear teeth 19 by a spring 23, so that the locking device locks the chuck body 1 and the tightening sleeve 2 against relative rotation in a direction loosening the jaws 4 when the latch pawl 20 is engaged in the second gear teeth 19, but permits relative rotation for tightening, so that tightening of the drill chuck is not impeded. Shown in the drawings are embodiments in which the second ring of teeth 19 is formed on the chuck body 1. For limiting rotation of the tightening sleeve 2 relative the jaw holder 3 between a first angular position corresponding to the latched condition of the latch pawl and a second angular position corresponding to the unlatched condition, the jaw holder 3 and the tightening sleeve 2 are formed respectively with a stop and a counterstop 11 so that this first angular position and this second angular position can be defined by means of a catch 12 that includes two catch seats 13. In the embodiments shown in the drawings, however, the tightening sleeve 2 is made of two parts with a release ring 22 that displaces the latch pawl 20 and that also carries the counterstop 11 and is the part that can be rotated relative to the jaw holder 3. Since here the release ring 22 is rotatable relative to the jaw holder 3, the front part of the tightening sleeve 2 can also be nonrotatable relative to the jaw holder 3 or rotationally fixed thereto. The catch 12 has a catch member 26 that does not permit the tightening sleeve 2 to rotate relative to the jaw until a predetermined tightening force has been attained, at least in the rotational direction of the tightening sleeve 2 that corresponds to release.

This occurs in that when the drill chuck is gripped the jaws 4 bear against the drill bit and thus further displacement of the jaws 4 encounters greater resistance that requires the application of increased torque when rotating the tightening sleeve 2 so that in this operating situation the catch 12 changes angular position between the second angular position and the first angular position with the latch pawl engaged in the second ring of teeth 19.

In order to enable the drill chuck to open to change a tool, the latch pawl 20 must again be disengaged from the second ring of teeth 19, to which end a second cam formation 21 is associated with the tightening sleeve 2 for displacing the latch pawl 20 when the tightening sleeve 2 is rotated in the rotational direction that corresponds to loosening the jaws 4. In order to ensure such release of the drill bit, in addition a device for limiting tightening in the drill chuck shown in the drawing is provided. To this end, there is a grip sleeve 5 that is rotatably carried on the chuck body 1 and in which a locking slide 6 is provided that, on movement from the second angular position to the first angular position, is displaced from a position that is not engaged with a first array of gear teeth 7 associated with the chuck body 1 into a position that is engaged. If the rotation occurs in the reverse direction, the locking slide 6 moves back out of engagement with the first gear teeth 7. Also provided is a stop for limiting relative rotation of the grip sleeve 5 with respect to the jaw holder 3 in the tightening direction, a cam formation 9 being associated with the tightening sleeve 2 for radial displacement of the locking slide 6. The cam formation 9 is formed on a control ring angularly fixed to the tightening sleeve 2 or the release ring 22 as an axially spaced collar 14 that engages in a transverse slot 15 of the locking slide 6, the control ring 10 also supporting the second cam formation 21 for the locking device. The stop 8 itself is formed by a pin 16 provided on the jaw holder 3 and engaging in a slot 17 formed in the grip sleeve 5 and extending angularly through an angle of 24° in the illustrated embodiment. A return spring 18 is provided between the grip sleeve 5 and the jaw holder 3.

In the embodiments shown in FIGS. 15 through 18, there are means for increasing the torque required at the beginning of the tightening process, specifically a bolt 30 mounted on the jaw holder 3 and pressed by a spring into a bolt seat 31 on the tightening sleeve, a bolt head 32 facing the bolt seat in cooperation with the bolt seat 31 being formed for determining the switching force in order to be able to minimize the spring force, and, after initiating the switching process, to be able to ignore the frictional resistance that could negatively impact the desired tightening force, that is, the force of the spring is selected to be as low as possible in order to ensure only engagement of the bolt 30 in the bolt seat 31.

Figure 17:
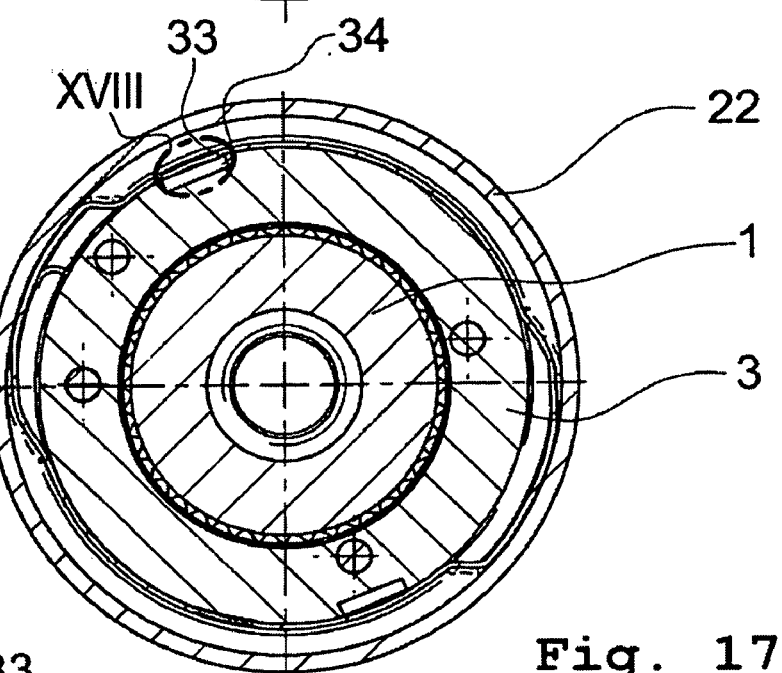
FIG. 17 is section XVII-XVII from FIG. 15.
Figure 18:
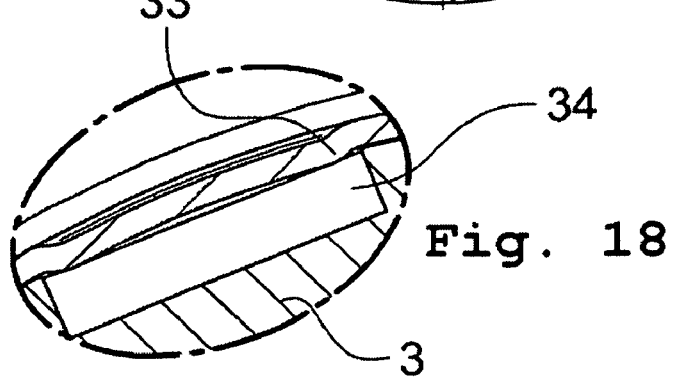
FIG. 18 is detail XVIII from FIG. 17.

FIGS. 17 and 18 show another embodiment in which the control ring 10 has at least one switching tab 33 that, prior to the start of the tightening process, engages in a tab pocket 34 formed on the jaw holder and exits it at the beginning of the tightening process. However, in this case there is a limitation in the maximum attainable tightening force due to the increased frictional resistance.

The functioning of the inventive drill chuck is described briefly in the following, specifically starting with a drill chuck with open jaws 4. If the shaft of a tool is engaged between the jaws 4 and the tightening sleeve 2 is rotated in the tightening direction corresponding to closing of the drill chuck, the stem 24 connected to the jaws 4 is rotated in a threaded bore 25 of the chuck body 1 and thus the jaws 4 are displaced axially forward toward the drill bit. When the jaws 4 are engage the drill bit, the angular resistance increases and the catch 12 changes the catch seat 13 and thus also the angular position so that the latch pawl engages in the second gear teeth 19 because the second cam formation 21 formed on the control ring 10 displaces the latch pawl 20. When the control ring 10 is rotated by the first cam formation 9, the locking slide 6 is also displaced radially inward so that, with the assistance of a spring 29, it engages the first gear teeth 7 and remains engaged even at high torques an the enlargement 28, and the locking slide 6 couples the grip sleeve 5 angularly to the chuck body 1 and limits tightening by means of the stop 8.

REFERENCE NUMBERS

1 Chuck body
2 Tightening sleeve
3 Jaw holder
4 Jaws
5 Grip sleeve
6 Locking slide
7 First ring of teeth
8 Stop
9 Cam formation
10 Control ring
11 Counterstop
12 Catch
13 Catch seat
14 Collar
15 Transverse slot
16 Pin
17 Slot
18 Return spring
19 Second gear
20 Latch pawl
21 Second cam formation
22 Release ring
23 Spring
24 Catch
25 Threaded bore
26 Catch member
27 Locking tooth
28 Enlargement
29 Spring
30 Bolt
31 Bolt seat
32 Bolt head
33 Switching tab
34 Tab pocket

The invention claimed is:

1. A self-tightening drill chuck having a chuck body, a tightening sleeve rotatable coaxially relative to the chuck body, axially fixed on a jaw holder carried on the chuck body, and in which jaws guided in grooves are movable with the jaw holder for tightening and loosening on a relative rotation between the chuck body and the tightening sleeve, a stop on the tightening sleeve and a counterstop on the jaw holder only permitting relative rotation of the tightening sleeve and the jaw holder between a first angular position and a second angularly offset position, a catch having a catch member with one catch seat associated with the first angular position and one catch seat associated with the second angular position being provided between the jaw holder and the tightening sleeve wherein a grip sleeve rotatable on the chuck body carries a locking slide that when changing between the second angular position and the first angular position is displaced from a position disengaged from a first array of gear teeth on the chuck body into an engaged position, and vice versa, and in that the stop is provided for limiting relative rotation of the grip sleeve and the jaw holder in a tightening direction.

2. The drill chuck in accordance with claim 1 wherein the tightening sleeve or the jaw holder have a cam formation for radially displacing the locking slide.

3. The drill chuck in accordance with claim 2 wherein the cam formation is formed on a control ring that is angularly fixed to the tightening sleeve, as an axially spaced collar that engages in a transverse slot of the locking slide.

4. The drill chuck in accordance with claim 1 wherein the stop is formed by a pin that is provided on the jaw holder and that engages in a slot formed on the grip sleeve and that extends angularly.

5. The drill chuck in accordance with claim 4 wherein the slot extends over an angle of 12° to 36°, preferably 24°.

6. The Drill chuck in accordance with claim 1 wherein a return spring is provided between the grip sleeve and the jaw holder.

7. The drill chuck in accordance with claim 1, further comprising,
a locking device that has, on the one hand, an array of second gear teeth that is coaxial with the chuck axis, and on the other hand, a latch pawl that is carried on the jaw holder and that engages in the second gear teeth under the force of a spring, and the locking device locks the chuck body and the latch pawl against relative rotations a direction loosening the jaws when the latch pawl is engaged in the second gear teeth, but permits relative rotations in a tightening direction, the first angular position corresponding to the latched condition and the second angular position corresponding to the unlatched condition of the latch pawl relative to the second gear teeth.

8. The drill chuck in accordance with claim 7 wherein the tightening sleeve has a second cam formation for displacing the latch pawl out of the engaged position in the ring of teeth into the disengaged position when the tightening sleeve is rotated in the direction that corresponds to loosening the jaws.

9. The drill chuck in accordance with claim 8 wherein the second cam formation is formed on the control ring.

10. The drill chuck in accordance with claim 7 wherein the latch pawl is formed as a two-arm lever having a first lever arm with at least one ratchet tooth and a second lever arm for positioning against the second cam formation.

11. The drill chuck in accordance with claim 10 wherein the spring acts on the first lever arm, which has the ratchet tooth.

12. The drill chuck in accordance with claim 7 wherein the pivot of the latch pawl and the pin are integrally formed by one part.

13. The drill chuck in accordance with claim 7 wherein the tightening sleeve is configured in two parts with a release ring that displaces the latch pawl.

14. The drill chuck in accordance with claim 7 wherein the second ring of teeth is formed on the chuck body.

15. The drill chuck in accordance with claim 1 wherein, for assuring engagement of the locking slide in the first gear teeth, an enlargement is provided that blocks outward radial displacement of the locking slide.

16. The drill chuck in accordance with claim 15 wherein the enlargement is formed on the release ring.

17. The drill chuck in accordance with claim 1, further comprising
- means for increasing the torque required at the beginning of a tightening process.

18. The drill chuck in accordance with claim 17 wherein carried in the jaw holder is a bolt that engages in a bolt seat associated with the tightening sleeve under the force of a spring.

19. The drill chuck in accordance with claim 18 wherein the bolt head facing the bolt seat is formed to cooperate with the bolt seat for determining the switching force.

20. The drill chuck in accordance with claim 18 wherein a force of the spring is selected to be as low as possible in order to assure that the bolt merely engages in the bolt seat.

21. The drill chuck in accordance with claim 17 wherein the control ring is formed with at least one switching tab that prior to the beginning of the tightening process engages in a tab pocket formed on the jaw holder and at the beginning of the tightening processes leaves it.

* * * * *